Aug. 24, 1965 R. S. MENNE 3,202,806

DIGITAL PARALLEL FUNCTION GENERATOR

Filed July 12, 1961 2 Sheets-Sheet 1

INVENTOR
R. S. MENNE
BY [signature]
ATTORNEY

INVENTOR
R. S. MENNE
BY [signature]
ATTORNEY 3,202,806
Patented Aug. 24, 1965

3,202,806

DIGITAL PARALLEL FUNCTION GENERATOR

Robert S. Menne, Morristown, N.J., assignor to Bell Telephone Laboratories, Incorporated, New York, N.Y., a corporation of New York Filed July 12, 1961, Ser. No. 123,591
3 Claims. (Cl. 235—175)

This invention relates to digital data processing circuits and, more particularly, to parallel carry or borrow generating circuits.

In the addition and subtraction of binary numbers, as with number systems in general, the sum or difference of each denominational order is a function of the corresponding order digits of the numbers being operated upon and the carry or borrow, as the case may be, generated as a product of the operation performed upon the digits of the immediately preceding less significant order. Each order carry or borrow may be expressed in Boolean algebraic terms as a function of the corresponding order digits of the numbers being operated upon and the immediately preceding less significant order carry or borrow. On the other hand, each carry or borrow also is susceptible of expression directly as a function of all the preceding digits of the numbers being operated upon.

Accordingly, two basic approaches to implementing carry and borrow circuits are generally recognized. In the first, each carry or borrow is generated as a function of the corresponding order digits of the numbers being operated upon and the previous order carry or borrow in a serial arrangement of function generating stages. This procedure has the advantage of requiring a minimum of logic circuit components to generate the desired carries or borrows but greatly protracts the generating process because of the long propagating paths which the signals representing carries or borrows must traverse. The second approach takes advantage of the fact that the carries and borrows may be expressed directly as a function of the numbers being operated upon by generating each carry or borrow directly from the numbers in what is commonly called a "parallel" function generating circuit arrangement. A reduction in length of the propagating paths is realized in the parallel arrangement but at the cost of an almost astronomical increase in the circuit complexity.

In many data processing applications the faster speed of operation of the parallel carry or borrow generating circuits as compared with the serial variety is considered a fair trade for the concomitant increase in circuit complexity of the parallel arrangement. Still attempts to diminish the circuit complexity of parallel function generators are continually being made. Such endeavors have usually resulted in hybrid circuit arrangements attempting to combine to some extent the attractive features of both types but in reality also protracting the speed of operation. For example, Weinberger et al. Patent 2,879,001, issued March 24, 1959 discloses small groups of parallel carry generators which are serially connected to one another. The converse approach has been taken in Rosenberger Patent 2,966,305, issued December 27, 1957. There, small groups of carries are generated serially and the groups are combined in parallel to round out the complete function generator. Neither of the above hybrid approaches, however, achieves the speed of operation attainable in a "pure" parallel function generator because they must strike a compromise between circuit complexity and speed of operation.

It is, therefore, the object of the present invention to reduce the circuit complexity of pure parallel carry and borrow generators.

In accordance with the above object, certain of the logic circuitry in a pure parallel function generator comprising a plurality of stages for generating desired functions is shared among the various stages so that partially developed functions that are required to generate a plurality of the desired functions need only be generated once.

More particularly, the logic circuitry required to generate the lowest order desired function is also required to generate each of the higher order desired functions. Likewise the need is repeated in the stages which develop each order desired function for logic circuitry deriving indications of the states of all the less significant order digits of the numbers to be operated upon. Rather than repeat the same logic circuitry in all the stages where a particular quantity is required to generate a desired function as would be dictated by a "straightforward" circuit implementation of the desired functions, according to the invention logic circuitry for deriving each particular quantity is provided only once and the outputs therefrom utilized in all the stages requiring that particular quantity. A substantial reduction in circuit complexity over a straightforward circuit implementation of the pure parallel function generator is thereby realized.

According to another feature of the invention, AND-NOT circuits are employed to advantage in implementing the function generating stages.

The above and other features of the invention will be considered in detail in the following specification taken in conjunction with the drawing in which.

Figure 1:
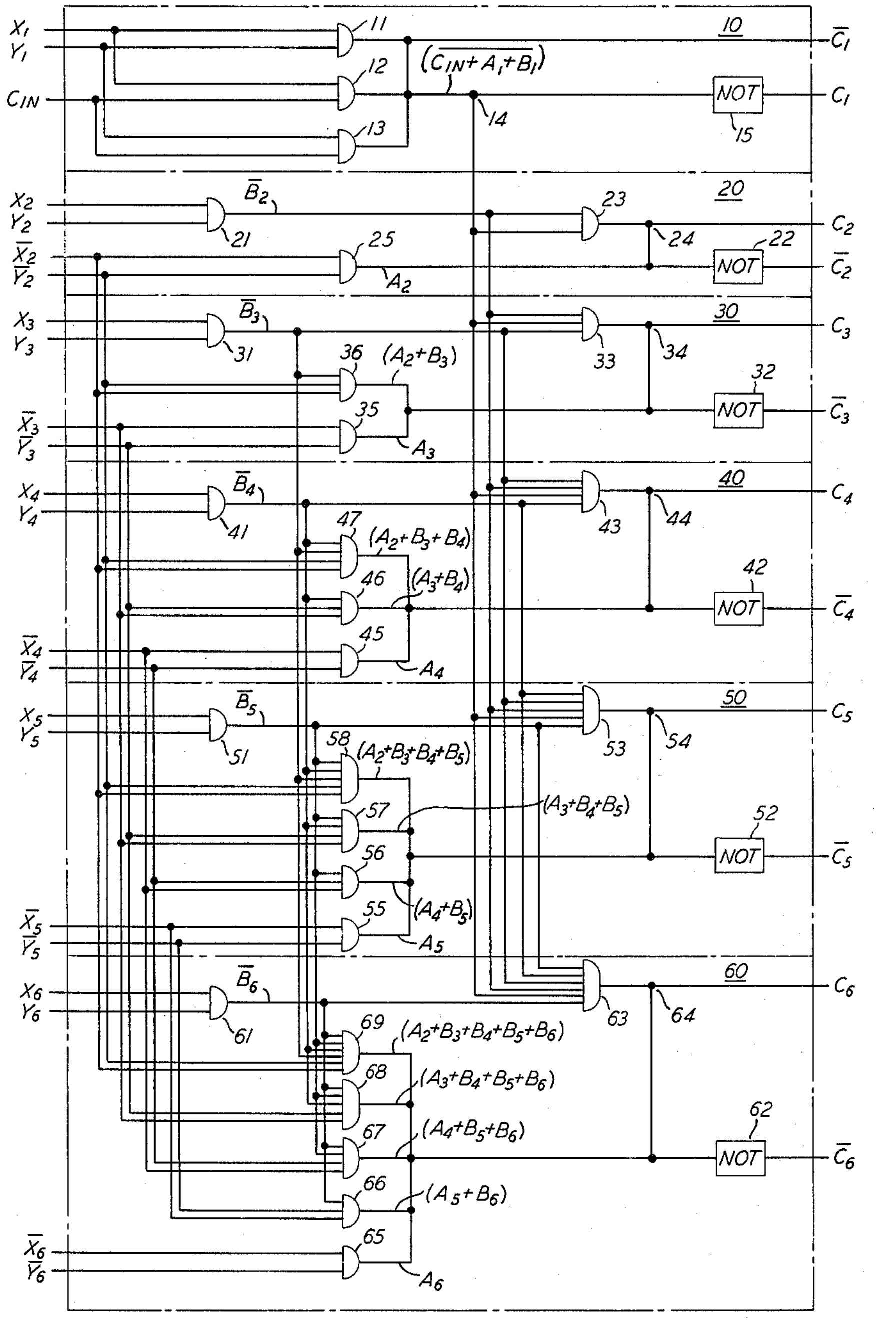
FIG. 1 is a functional schematic diagram of a parallel circuit arrangement according to the invention for generating carries.

In the operation of binary addition, the sum of each denominational order can be expressed by the Boolean algebraic formula $$S_i=\overline{X}_i\overline{Y}_iC_{i-1}+\overline{X}_iY_i\overline{C}_{i-1}+X_i\overline{Y}_i\overline{C}_{i-1}+X_iY_iC_{i-1} \quad (1)$$

In this equation $S_i$ designates the sum of the $i$th order, $X_i$ and $Y_i$ represent the $i$th order digits of the augend and addend numbers, and $\overline{X}_i$ and $\overline{Y}_i$ are the inverse or complements of these augend and addend digits. $C_{i-1}$ represents the preceding less significant order carry and $\overline{C}_{i-1}$ is the inversor complement of that carry. From consideration of Equation 1, it is evident that the carry developed as a by-product of the addition of the digits of the previous less significant order is utilized to generate the sum of each order. Each carry in turn can be expressed by the formula $$C_i=C_{i-1}(X_i+Y_i)+X_iY_i \quad (2)$$

wherein the terms used are as defined in Equation 1. From Equation 2, it is apparent that each order carry is dependent upon the previous less significant order carry. It is known, however, that by Boolean algebraic manipulations each order carry can also be expressed directly as a function of only the digits of the numbers to be added. It is this principle which is utilized in parallel carry generation.

The lowest order carry $C_1$ can be expressed by the formula $$C_1=C_{in}A_1+B_1 \quad (3)$$

where $A_1=X_1+Y_1$, and $B_1=X_1Y_1$. The second, third, and fourth order carries can be expressed exclusively as a function of the numbers to be added by the formulas $$C_2=A_2(C_{in}A_1+B_1+B_2) \quad (4)$$

$$C_3=A_3(A_2+B_3)(C_{in}A_1+B_1+B_2+B_3) \quad (5)$$

and $$C_4=A_4(A_3+B_4)(A_2+B_3+B_4)(C_{in}A_1+B_1+B_2+B_3+B_4) \quad (6)$$

respectively, wherein the "A" and "B" terms carry the same designation as in Equation 3. The $i$th order carry may be expressed exclusively as a function of the numbers to be added by the generic formula $$C_i=A_i(A_{i-1}+B_i)(A_{i-2}+B_{i-1}+B_i) \ldots (A_2+B_3+B_4+ \ldots +B_{i-1}+B_i)(C_{in}A_1+B_1+B_2+ \ldots +B_{i-1}+B_i) \quad (7)$$

It can be seen from perusal of Equations 3 through 7 that the complete expression for the first order carry also appears in each of the higher order carries. Further, the "B" term corresponding to each order carry is repeated in the expression for each of the higher order carries. The invention takes advantage of these characteristics of the formulas to reduce the complexity of the carry generating circuits implemented therefrom.

Figures 2, 3:
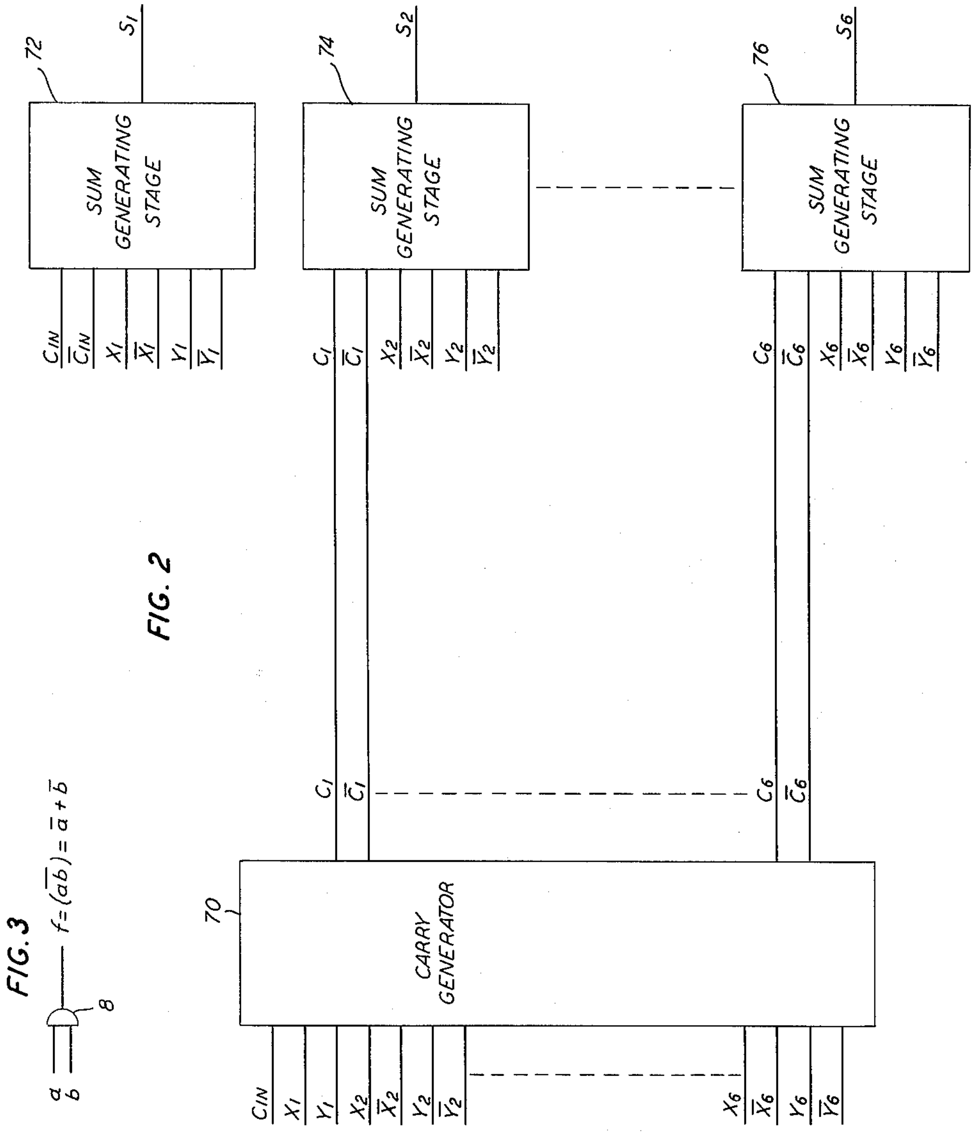
FIG. 2 is a block diagram of a complete binary adder showing the function of a carry generator in such an adder.
FIG. 3 illustrates the logical function performed by the basic building blocks employed in FIG. 1.

FIG. 3 depicts the logical function performed by the building blocks employed to illustrate the invention—the AND-NOT function. If a binary "1" is applied to both terminals $a$ and $b$ of AND-NOT gate 8, a binary "0" appears at the output thereof. A binary "1" is developed at the output of AND-NOT gate 8 whenever both $a$ and $b$ are not in the "1" state.

In FIG. 1 carry generating stages 10, 20, 30, 40, 50, and 60 generate in parallel fashion progressive order carries as a function of the digits, X and Y, of the numbers to be added. $X_1$ and $Y_1$ are applied to an AND-NOT gate 11 in the first carry generating stage 10, and the output $(\overline{X_1Y_1})$ results, $X_1$ and $C_{in}$ are applied to an AND-NOT gate 12 to produce an output $(\overline{X_1C_{in}})$, and $Y_1$ and $C_1$ are applied to an AND-NOT gate 13 which develops an output of $(\overline{Y_1C_{in}})$. The outputs of each of the three above AND-NOT gates are joined at a common node 14. Assuming that the binary state "0" is approximately at ground potential and the binary state "1" is either at a positive or negative potential with respect to ground, node 14 remains in the binary state "0" unless and until the outputs from all of AND-NOT gates 11, 12, and 13 are in the binary state "1" at which time node 14 assumes the binary state "1." A more detailed description of the operation of this circuit configuration may be had by reference to my copending application Serial No. 114,837, filed June 5, 1961, now abandoned. The above describes an AND function. Hence, the outputs from AND-NOT gates 11, 12, and 13 combine at node 14 in the manner: $\overline{(X_1Y_1)}.\overline{(Y_1C_{in})}.\overline{(X_1C_{in})}$. This expression can be manipulated by use of Boolean algebraic techniques into the form $\overline{(X_1Y_1+X_1C_{in}+Y_1C_{in})}$ which equals $\overline{(C_{in}A_1+B_1)}$. The function derived at node 14, therefore, is $\overline{C}_1$, the inverse of the first order carry. $C_1$, the first order carry "per se" is provided by applying the signal at node 14 to the input of a NOT gate 15.

In the second order carry generating stage 20, $\overline{B}_2$ is derived from an AND-NOT gate 21 to the inputs of which are applied $X_2$ and $Y_2$. Simultaneously therewith, $A_2$ is developed by an AND-NOT gate 25 from inputs $\overline{X}_2$ and $\overline{Y}_2$. As discussed above, all the higher order carries are a function of the first order carry. To avoid repeating generation of the first order carry, the first order carry as generated in stage 10 at node 14, or more precisely, the inverse of the first order carry, is applied to stage 20 where it is coupled to an AND-NOT gate 23 along with $\overline{B}_2$ to derive $C_{in}A_1+B_1+B_2$ at the output of AND-NOT gate 23. The output of AND-NOT gate 23 is joined with AND-NOT gate 25 at a common node 24 where the signals combine to form $C_2$ in a fashion similar to that discussed above with respect to node 14. The signal produced at node 24 is also applied to a NOT gate 22 from the output of which emanates $\overline{C}_2$.

Similarly in the third order carry generating stage 30, $\overline{B}_3$ is developed in an AND-NOT gate 31 as a function of $X_3$ and $Y_3$ and $A_3$ is generated in an AND-NOT gate 35 as a function of $\overline{X}_3$ and $\overline{Y}_3$. $\overline{X}_2$ and $\overline{Y}_2$ along with the output from AND-NOT gate 31, $\overline{B}_3$, are applied as inputs to an AND-NOT gate 36 which produces $A_2+B_3$ therefrom. As pointed out above, the term $B_2$ appears in the formula expressing all the carries of the orders higher than the second. Again, rather than generate $B_2$ all over again, $\overline{B}_2$, generated in stage 20 by AND-NOT gate 21, and the signal at node 14 representative of the first carry are applied to stage 30 to contribute to the formation of the third order carry. $\overline{C}_1$, $\overline{B}_2$, and $\overline{B}_3$ are all coupled to an AND-NOT gate 33 whose output signal is $C_{in}A_1+B_1+B_2+B_3$. The output of AND-NOT gate 33 is joined with the outputs from AND-NOT gates 35 and 36 at a common node 34 where $C_3$ is available. $\overline{C}_3$ is developed by a NOT gate 32 as shown in FIG. 1.

The higher order carries are generated in carry generating stages 40, 50, and 60 in similar fashion. In each stage the "B" term (shown derived by AND-NOT gates 41, 51 and 61) and the "A" term (shown derived by stages 45, 55 and 65) corresponding to the order carry being generated are produced. The inverse of the first order carry, the inverse of the "B" terms from all of the preceding less-significant orders, and the inverse of the "B" term of the corresponding order are applied to an AND-NOT gate (shown as AND-NOT gates 43, 53 and 63) which produces the last term in brackets in Equation 7. The intermediate terms in brackets in Equation 7 are also derived with the aid of the "B" terms generated by AND-NOT gates 31, 41, 51, and 61. For example, in stage 60, $\overline{B}_6$ derived by AND-NOT gate 61 is applied to AND-NOT gates 66, 67, 68, and 69; $\overline{B}_5$ derived by AND-NOT gate 51 is applied to AND-NOT gates 67, 68, and 69; $\overline{B}_4$ derived by AND-NOT gate 41 is applied to AND-NOT gates 68 and 69; and $\overline{B}_3$ derived by AND-NOT gate 31 is applied to AND-NOT gate 69.

In each stage individual intermediate terms embodying different "A" terms for each of the lower orders above the second order and "B" terms for each order above the corresponding "A" term up to and including the order of the carry being generated are produced from the "B" terms and the inverse of the digits of the numbers to be added as dictated by Equation 7. For example, in stage 50, AND-NOT gate 58 produces $(A_2+B_3+B_4+B_5)$, AND-NOT gate 57 produces $(A_3+B_4+B_5)$, and AND-NOT gate 56 produces $(A_4+B_5)$.

The outputs of the AND-NOT gates of each stage, with the exception of the AND-NOT gate developing the "B" term, are joined at a common node (shown as nodes 44, 54 and 64). Exemplary of this is stage 40 wherein the outputs of AND-NOT gates 45, 46, and 47 for developing the intermediate terms associated with the fourth order carry are joined with the output from AND-NOT gate 43 at common node 44. The carries "per se" are available at the common nodes and their inverses are derived by means of NOT gates (shown as NOT gates 42, 52 and 62).

By virtue of the principles enunciated above to implement the carries, pure parallel carry generation is achieved with a substantial reduction in the number of circuit components required to implement the carry generators as compared with a straightforward circuit implementation. In the circuit shown in FIG. 1 no degradation in the speed of operation accompanies this improvement. The longest path that any signal must traverse is three gates thus insuring fast speed of operation in response to applied digital signals. The limit to the practice of the invention will probably be encountered in the "fan-in" (number of inputs) and "fan-out" (number of outputs) capabilities of the AND-NOT gates employed. It is clear from FIG. 1 that the "fan-in" and "fan-out" capabilities of the building blocks are taxed more and more in progressive orders.

These principles can of course be applied to implementation of parallel carry generators with types of building blocks other than AND-NOT gates. AND-NOT gates, however, provide a convenient means for producing the desired carries.

FIG. 2 depicts a binary parallel adder in which the circuitry of FIG. 1 can be employed. A carry generator 70 is representative of the circuitry shown in FIG. 1. The input carry, $C_{in}$, may represent the carry from the previous stage if the adder shown in FIG. 1 is to be only an intermediate section of a complete adder or could be the carry from the last stage in the chain if the technique of "end around" carry is to be employed. In response to the inputs applied to the left of carry generator 70, all the order carries and their inverses are made available simultaneously and in quick response at the right of carry generator 70. These carries are applied to their respective sum generating stages indicated by stages 72, 74 and 76 together with the appropriate digits of the numbers being added wherein the sum of each order is derived. Sum generating stages 72, 74 and 76 may be constructed of any arrangement of logic circuitry which will perform the function expressed by Equation 1.

It will be understood that the invention may be utilized to implement borrow generators for binary subtractors and other sundry data processing circuits of a similar nature.

What is claimed is:

1. In a digital parallel arithmetic function generator, a first source of numbers to be operated upon, a second source of numbers to be operated upon, a first arithmetic function generating stage for developing a desired digital quantity from the least significant denominational order of digits of said numbers, a second arithmetic function generating stage including means for developing a digital quantity representative of $B_2$ where $B_2=X_2Y_2$, $X_2$ is the second least significant denominational order digit of said first number and $Y_2$ is the second least significant denominational order digit of said second number, means for developing a digital quantity representative of $A_2$ where $A_2=X_2+Y_2$, and means for developing a digital quantity corresponding to the second least significant denominational order from the desired quantity of said first stage, said quantity representative of $B_2$, and said quantity representative of $A_2$, and a subsequent arithmetic function generating stage corresponding to each denominational order of said numbers, each of said subsequent carry generating stages including means for developing a digital quantity representative of $B_i$ where $B_i=X_iY_i$ and $i$ represents the order being operated upon, means for developing a digital quantity representative of $A_i$ where $A_i=X_i+Y_i$ and $i$ represents the order being operated upon, means for developing a plurality of intermediate terms representative of $$(A_{i-1}+B_i)(A_{i-2}+B_{i-1}+B_i)\ \ldots\ (A_2+B_3+B_4+\ \ldots\ +B_{i-1}+B_i)$$

one corresponding to each less significant order with the exception of the lowest order from the "B" terms corresponding to all the lower order stages with the exception of the lowest order and $B_i$, and means for developing a digital quantity representative of the desired quantity of the order being operated upon from the quantity representative of $B_i$, the quantity representative of $A_i$, the quantities representative of said intermediate terms, the desired quantity from said first stage, and the "B" terms corresponding to all the lower order stages with the exception of the lowest order.

2. The apparatus of claim 1 in which said arithmetic function generator is a carry generator, said first source of numbers is a source of addend numbers, said second source of numbers is a source of augend numbers, the desired digital quantity developed by said first arithmetic function generating stage is the least significant denominational order carry, the digital quantity developed by said means for developing a digital quantity corresponding to the second least significant denominational order of said second arithmetic function generating stage is the second least significant denominational order carry, and the digital quantity developed by said means for developing a digital quantity representative of the desired quantity of the order being operated upon of each of said subsequent arithmetic function generating stages is the corresponding denominational order carry.

3. The apparatus of claim 1 in which said second arithmetic function generating stage includes a first AND-NOT circuit to which is applied the second least significant order of digits of said numbers and in which each of said subsequent function generating stages comprises a first AND-NOT circuit to which is applied the corresponding order of digits of said numbers; a second AND-NOT circuit to which is applied the output of the first AND-NOT circuit of the stage corresponding to the order being operated upon, the outputs of the first AND-NOT circuits corresponding to the less-significant orders with the exception of the lowest order, and the inverse of the desired digital quantity developed by said first stage; a third AND-NOT circuit to which is applied the inverse of the digits of the order of said numbers being operated upon; a plurality of additional AND-NOT circuits, one corresponding to each less-significant order with the exception of the lowest order, to each of which is applied the inverse digits of a different one of the less-significant orders of said numbers and to each of which is applied the outputs of the first AND-NOT circuits corresponding to all the orders higher than the order of the inverse digits applied thereto up to and including the order being operated upon; and means for connecting the output terminal of said second AND-NOT circuit, said third AND-NOT circuit, and said additional AND-NOT circuits together to form a common node at which the desired function of the order of the numbers being operated upon appears.

References Cited by the Examiner

UNITED STATES PATENTS

| | | | |
|---|---|---|---|
| 2,879,001 | 3/59 | Weinberger et al. | 235—175 |
| 2,966,305 | 12/60 | Rosenberger | 235—175 |
| 3,023,962 | 3/62 | Stafford | 235—175 |

MALCOLM A. MORRISON, *Primary Examiner.*

WALTER W. BURNS, Jr., *Examiner.*